United States Patent [19]

Takizawa et al.

[11] Patent Number: 4,685,689
[45] Date of Patent: Aug. 11, 1987

[54] VEHICLE SUSPENSION RESPONSIVE TO VERTICAL ACCELERATION AND CHANGE IN HEIGHT

[75] Inventors: Shozo Takizawa; Minoru Tatemoto, both of Okazaki; Akio Furumura, Toyota; Tadashi Sugawara, Okazaki; Shigeo Kariya, Nagoya; Kazuo Hiroshima, Okazaki, all of Japan

[73] Assignee: Mitsubishi Jidosha Kogyo Kabushiki Kaisha, Tokyo, Japan

[21] Appl. No.: 738,667

[22] Filed: May 28, 1985

[30] Foreign Application Priority Data

| May 31, 1984 | [JP] | Japan | 59-109527 |
| May 31, 1984 | [JP] | Japan | 59-109528 |
| May 31, 1984 | [JP] | Japan | 59-109531 |
| May 31, 1984 | [JP] | Japan | 59-80643[U] |
| May 31, 1984 | [JP] | Japan | 59-80644[U] |

[51] Int. Cl.⁴ .................................... B60G 17/00
[52] U.S. Cl. ................................................ 280/707
[58] Field of Search ............... 280/707, 6 R, 6.1, 703, 280/714; 180/41

[56] References Cited

U.S. PATENT DOCUMENTS

| 3,124,368 | 3/1964 | Corley et al. | 280/DIG. 1 |
| 4,145,073 | 3/1979 | McLuckie | 280/714 |
| 4,266,790 | 5/1981 | Uemurg et al. | |
| 4,364,574 | 12/1982 | Saito | 280/707 |
| 4,462,610 | 7/1984 | Saito et al. | 180/41 |
| 4,564,215 | 1/1986 | Kumagi et al. | 280/707 |

FOREIGN PATENT DOCUMENTS

| 0139145 | 5/1985 | European Pat. Off. |
| 3223140 | 12/1983 | Fed. Rep. of Germany ..... 280/6 R |
| 2251451 | 8/1974 | France |
| 57-144133 | 9/1982 | Japan |
| 0180310 | 10/1983 | Japan ................................. 280/6 R |
| 2068308 | 8/1981 | United Kingdom |

Primary Examiner—John J. Love
Assistant Examiner—Karin L. Ferriter
Attorney, Agent, or Firm—Frishauf, Holtz, Goodman & Woodward

[57] ABSTRACT

Judgement of a rough road is made when detecting the number of upward and downward movements exceeding the set range of the vehicle height within a predetermined period of time by the vehicle height sensors or when detecting the upward and downward acceleration exceeding the set value within a predetermined period of time by an acceleration sensor. Since a high vehicle height is automatically set as a target vehicle height to control the vehicle height toward the same high vehicle height by the control unit, the minimum ground height of the body is raised to reduce a contact of the body with the surface of the road, thereby improving drivability of a vehicle on a rough road and decreasing damage of the body. Therefore, even if the first condition is not satisfied by the vehicle height sensor after the vehicle height is controlled to the high vehicle height, the second condition is satisfied by the acceleration sensor to reliably judge the rough road, thereby eliminating a hunting of controlling the vehicle height when traveling on a rough road as in the conventional apparatus.

17 Claims, 13 Drawing Figures

VEHICLE SUSPENSION RESPONSIVE TO VERTICAL ACCELERATION AND CHANGE IN HEIGHT

BACKGROUND OF THE INVENTION

The present invention relates to a vehicle suspension apparatus having a vehicle height control function capable of setting a vehicle height to at least a normal vehicle height and a high vehicle height, and higher than the normal vehicle height for automatically setting the vehicle height to the high vehicle height when travel on a rough road is detected.

A conventional suspension apparatus is known for increasing a vehicle clearance by raising the minimum ground height of a vehicle when traveling on a rough road to improve the drivability of the rough road by reducing contact of a vehicle body with the surface of the road, thereby reducing damage to the vehicle body. It utilizes a method of detecting a rough road when a counted value exceeds a set value by counting the number of reciprocations of a vehicle height sensor from a vehicle height higher than a set height range to another vehicle height lower than the set height range within a predetermined set time (FIG. 1). However, according to this conventional method, the center of the amplitude of the vehicle height value detected by the sensor becomes higher as shown in FIG. 2 after the height is controlled to a higher value when detecting a rough road. Thus, while the vehicle travels on a rough road, the vehicle height lower than the set height range cannot be obtained. Therefore, when the vehicle continuously travels on a rough road, the vehicle target height becomes "high" and "normal", resulting in a hunting of the vehicle height.

On the other hand, the vertical acceleration of the vehicle body can be detected by a G sensor to determine from the output of the sensor when a rough road is being traveled. However, when the output of the G sensor is alone used to detect whether or not the vehicle is running on a rough road, a delay can occur in determining a rough road condition due to a difference between the time the vehicle enters a rough road from a smooth road and the time the vehicle body is vertically accelerated, the latter occurring later than the former.

SUMMARY OF THE INVENTION

It is an object of the present invention provide a vehicle suspension apparatus which can set a vehicle height at a normal vehicle height and at a vehicle height higher than the normal height with a vehicle height sensor and an acceleration sensor for controlling the vehicle height to a higher value with detecting a rough road by a signal from the height sensor or the acceleration sensor to prevent a hunting of the vehicle height.

It is another object of the invention to provide a vehicle suspension apparatus which is capable of promptly lifting the vehicle height when the vehicle enters a rough road from a smooth road.

According to the present invention, there is provided a vehicle suspension apparatus comprising: fluid spring chambers provided between wheels and a vehicle body for controlling a vehicle height; fluid supply means for supplying a fluid from a fluid supply source to the fluid spring chambers through supply valves; fluid exhaust means for exhausting the fluid from the fluid spring chambers through fluid exhaust valves; a vehicle height sensor for detecting a vehicle height; an acceleration sensor for detecting the upward and downward accelerations acted on the vehicle body; control means for controlling the fluid supply valves or the fluid exhaust valves to control the vehicle height toward a target vehicle height by comparing the vehicle height detected by the vehicle height sensor with a set target vehicle height; rough road judgement means for judging a rough road when satisfying a first condition for detecting more than the predetermined number of the vehicle heights exceeding a set range of the vehicle height within a set period of time by the vehicle height sensor or satisfying a second condition for detecting more than the predetermined number of changes of the acceleration exceeding a set range of the acceleration within a set period of time by the acceleration sensor and eliminating the judgement of the rough road when not satisfying any of the first and second conditions; and target vehicle height set means for setting a normal vehicle height as a target vehicle height in the control means at the normal time and setting a vehicle height higher than the normal vehicle height as a target vehicle height when the judgement of the rough road is made by the rough road judgement means.

According to the present invention, since a high vehicle height is automatically set as a target vehicle height to control the vehicle height toward the same high vehicle height when the rough road is detected, the minimum ground height of the body is raised to reduce a contact of the body with the surface of the road, thereby improving a drivability of the vehicle on the rough road and decreasing a damage of the body. Further, the judgement of the rough road made when satisfying the first condition for detecting more than the predetermined number of vehicle heights exceeding the set range of the vehicle height within a set period of time by the vehicle height sensor or when satisfying the second condition for detecting more than the predetermined number of changes of the acceleration exceeding the set range of the acceleration within a set period of time by the acceleration sensor. Therefore, even if the first condition is not satisfied by the vehicle height sensor after the vehicle height is controlled to the high vehicle height, the second condition is satisfied by the acceleration sensor to reliably judge the rough road, thereby eliminating a hunting of controlling the vehicle height when traveling on a rough road as in the conventional apparatus. Further, a displacement of a stroke of a suspension occurs prior to the variation of the acceleration acted on the vehicle body immediately after the vehicle travels from a good road to a rough road. However, even if the second condition is not satisfied by the acceleration sensor, the first condition is satisfied by the vehicle height sensor to reliably detect the rough road without time delay of the judgement of the rough road.

DETAILED DESCRIPTION OF THE PREFERRED EMBODIMENTS

The present invention will be described in detail with reference to the preferred embodiments in conjunction with the accompanying drawings.

Figure 1:
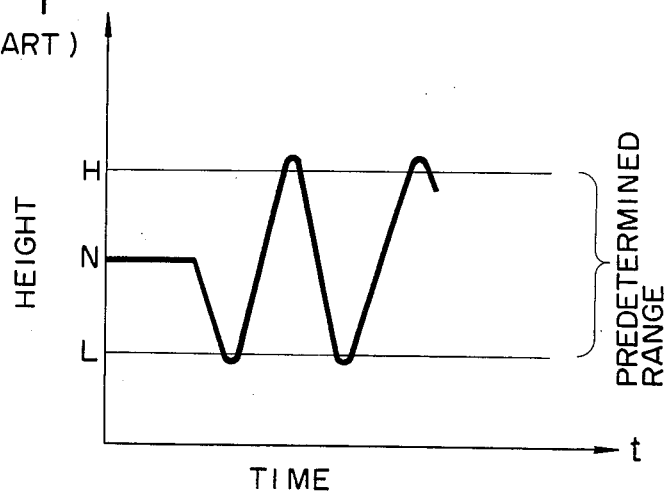
FIGS. 1 and 2 are views for explaining the judgement of a rough road by a conventional apparatus.
Figure 2:
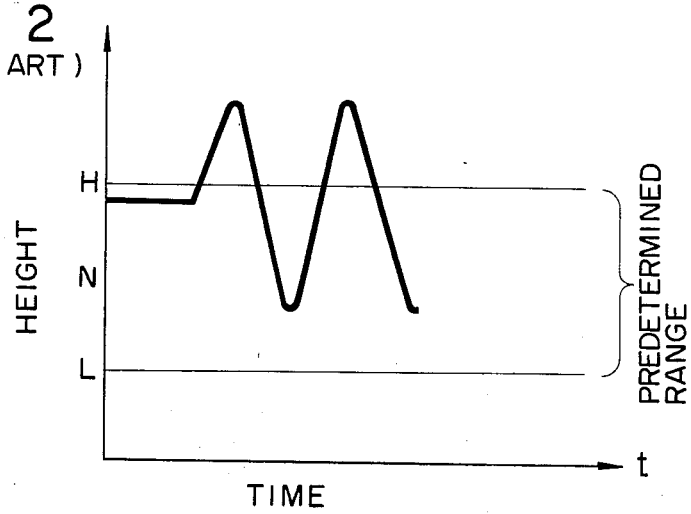
Figure 3:
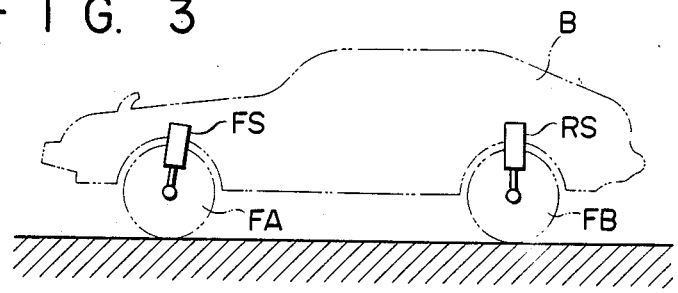
FIG. 3 is a diagram of a vehicle having a suspension apparatus according to the present invention.
Figure 4:
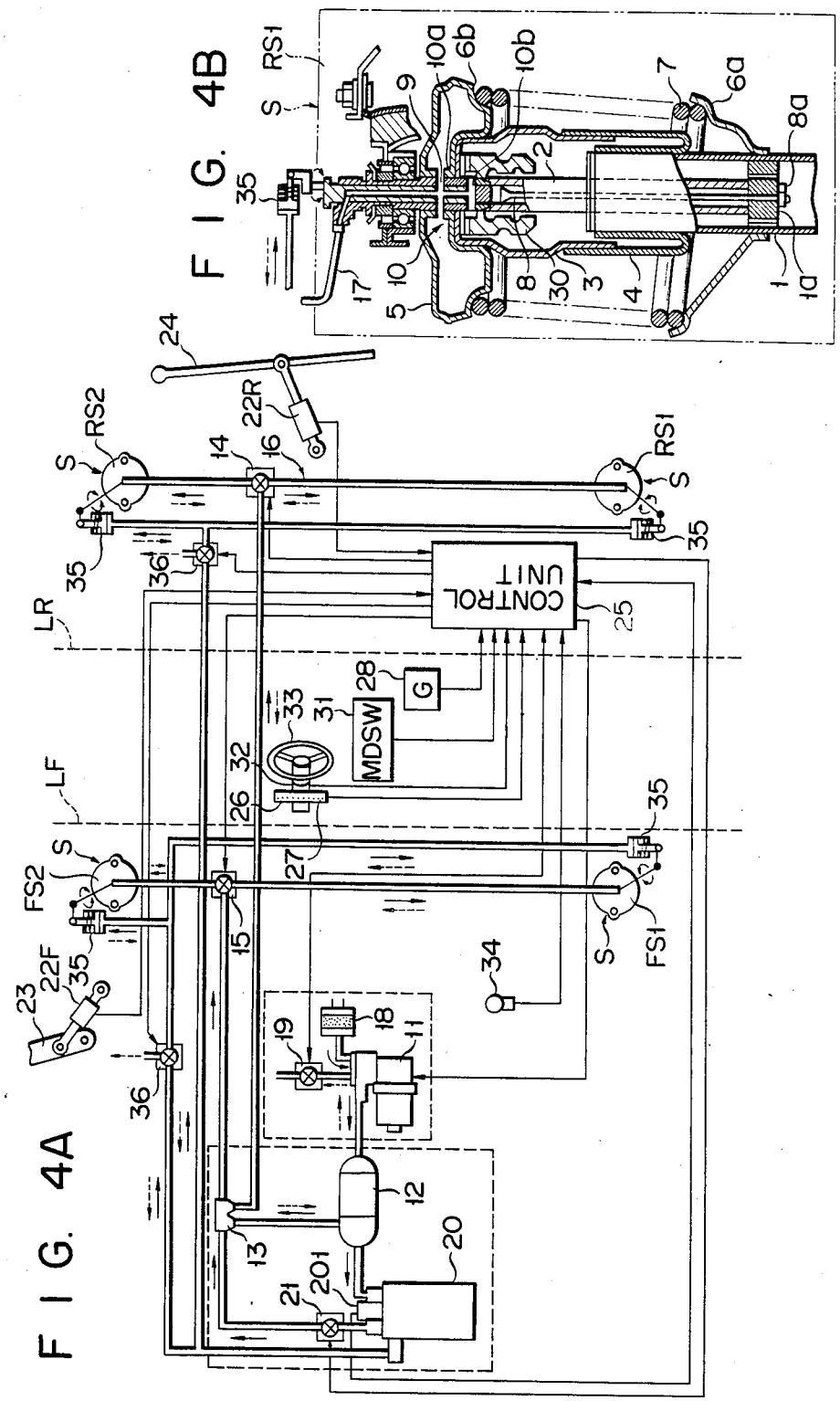
FIG. 4A is a view of the entire suspension apparatus according to the present invention.
FIG. 4B is a sectional view of a suspension unit.

FIGS. 3 to 7 show a first embodiment of the present invention. In FIG. 3, reference character B denotes a vehicle body; FA, front wheels; and FB, rear wheels. Front suspension units FS (FS1, FS2) are interposed between the body B and the front wheels FA, and rear suspension units RS (RS1, RS2) are interposed between the body B and the rear wheels FB. In FIG. 4A, the unit FS1 is a front left wheel suspension unit; FS2, a front right wheel suspension unit; RS1, a rear left wheel suspension unit; and RS2, a rear right wheel suspension unit. The units FS1, FS2, RS1 and RS2 have an identical structure and are exemplified by the suspension unit S except when the units for the front and rear or right and left wheels are described distinctly, and only a necessary portion for controlling the vehicle height will be shown.

In FIG. 4B, the suspension unit S comprises a strut type attenuation switching shock absorber 1. The shock absorber 1 has a cylinder mounted at the wheel side, a piston 1a slidably telescoped into the cylinder, and a piston rod 2 supported at its upper end to the body B. The shock absorber provides a damping function in response to the position of a control valve 8a to be described in detail later when the cylinder elevates to the piston rod 2 in response to the upward and downward movements of the wheels.

The suspension unit S further comprises a main air spring chamber 3 which has a function of controlling a vehicle height coaxially with the piston rod 2 at the top of the shock absorber 1. The main air spring chamber 3 is partly formed of a bellows 4 to raise or lower the vehicle height by supplying or exhausting air to or from the air spring chamber 3. An auxiliary air spring chamber 5 is provided coaxially with the piston rod 2 immediately above the main air spring chamber 3.

A spring retainer 6a directed upward is provided on the outer wall of the cylinder of the shock absorber 1, and a spring retainer 6b directly downward is provided on the outer wall of the auxiliary air spring chamber 5. A coiled spring 7 is contracted between both spring retainers 6a and 6b. The coiled spring 7 supports part of the weight of the body B.

Both air spring chambers 3 and 5 communicate with each other through a communicating path 9 perforated in the control rod 8 rotatably inserted into the piston rod 2, and an opening and closing valve 10 having spring constant switching function is provided in the path 9. The valve 10 has a first valve portion 10a which controls communication/noncommunication between the chamber 5 and the path 9, and a second valve portion 10b which controls communication/noncommunication between the chamber 3 and the path 9. In the open mode of the valve 10, the chamber 3 and the chamber 5 are communicated with each other, thereby decreasing the spring constant. In the closed mode of the valve 10, the chamber 3 and the chamber 5 are closed, thereby increasing the spring constant. In other words, the volume of the spring chamber can be varied by opening or closing the valve 10 by turning the control rod 8 to change the spring constant of the suspension.

The control valve 8a which can vary the area of an orifice of the piston 1a of the shock absorber 1 is provided at the lower end of the rod 8. The valve 8a increases the area of the orifice of the piston 1a when the valve 10 is in the open mode by the rod 8 to reduce an attenuating force, and decreases the area of the orifice of the piston 1a when the valve 10 is in the closed mode to increase the attenuating force.

A circuit for supplying and exhausting air to and from the air spring chamber 3 of the suspension unit S will now be described in detail. A compressed air for controlling the vehicle height is supplied to the respective suspension units S from a compressor 11 as a compressed air generator through a drier 12, a joint 13, a rear solenoid valve 14 or a front solenoid valve 15, a pipe 16 for connecting them, and a communicating port 17 communicated with the path 9 in the partial pipe-like control rod 8 for connecting them.

The compressor 11 compresses atmospheric air intaken from an air cleaner 18 and supplies the compressed air to the drier 12. The compressed air dried by silica gel of the drier 12 is supplied to the respective suspension units S as denoted by arrows with solid lines of FIGS. 4A and 4B. When the compressed air is exhausted from the respective suspension units S, the compressed air is exhausted into the atmospheric air through an exhaust solenoid valve 19 as denoted by arrows with broken lines of FIGS. 4A and 4B.

A reserve tank 20 is connected to the drier 12, and part of the compressed air is supplied from the tank 20 through an air supply solenoid valve 21 to the respective suspension units S.

Part of the compressed air from the drier 12 is, if the rear solenoid valve 14 or the front solenoid valve 15 is open, supplied directly to the valve 14 or 15 through the bypass and the joint 13, but not through the reserve tank.

Reference numeral 22F denotes a front vehicle height sensor for detecting the front vehicle height of a vehicle mounted on a lower arm 23 of the front right suspension of the vehicle; and 22R, a rear vehicle height sensor for detecting the rear vehicle height of the vehicle mounted on a lateral rod 23 of the rear left suspension of the vehicle. A front vehicle height detection signal and a rear vehicle height detection signal from the sensors 22F and 22R are supplied to a control unit 25 having a microcomputer as a vehicle height controller.

Each of these sensors 22F and 22R comprises a Hall IC element and a magnet, one of which is mounted on the wheel side and the other of which is mounted on the body side so as to detect the distance between the current level and a normal, high or low vehicle height level. More particularly, the sensors output a vehicle height detection signal N in case of the normal vehicle height, L in case of the low vehicle height level, H in case of the high vehicle height level, LL in case of the vehicle height level lower than the low vehicle height level, NL in case of the vehicle height level between the low vehicle height level and the normal vehicle height level, NH in case of the vehicle height level between the normal vehicle height level and the high vehicle height level, and HH in case of the vehicle height level higher than the high vehicle height level. Both vehicle height sensors may be of another type such as that employing a phototransistor.

Reference numeral 27 denotes a vehicle velocity sensor contained in a speedometer 26. The sensor 27 supplies a detected vehicle speed signal to a control unit 25. The sensor 27 may use a sensor of a lead switching type in a mechanical speedometer and an open collector outputting type by a transistor in an electronic speedometer.

Reference numeral 28 denotes an acceleration sensor (G sensor) for detecting the acceleration operated on the vehicle body. The sensor 28 serves to detect the forward or backward, leftward or rightward and upward or downward acceleration of the sprung mass of the suspension of the vehicle, i.e., of the vehicle body. When no acceleration acts, a weight is suspended, a light from a light emitting diode is shielded by a shielding plate which cooperates with the weight and does not reach a photodiode to detect no acceleration. When an acceleration higher than the set value acts on the vehicle body, the weight is inclined or moved thereby detecting the acceleration. A signal of the sensor 28 is supplied to the control unit 25.

Reference numeral 32 denotes a steering sensor for detecting the rotating velocity of a steering wheel 33, i.e., the steering angular velocity. Reference numeral 34 denotes an accelerator sensor for detecting the depressing velocity of an accelerator pedal of an engine (not shown). The detection signals of the sensors 32 and 34 are supplied to the control unit 25.

Reference numeral 35 denotes a pneumatic drive mechanism provided at each suspension unit S for rotating the control rod 8 through the communication of a 3-way directional valve 36. The valve 36 can select any of a first position for communicating between the pneumatic drive mechanism 35 and the atmosphere and a second position for communicating between the pneumatic drive mechanism 35 and the reserve tank 20 by a control signal from the control unit 25, thereby allowing the drive mechanism 35 to control the rotation of the control rod 8. The drive mechanism 35 holds the control rod 8 at a soft position for holding the spring constant and the attenuating force of the suspension unit S small when the valve 36 is disposed at the first position and holds the control rod 8 at the hard position for holding the spring constant and the attenuating force of the suspension unit S when the valve 36 is disposed at the second position. The pneumatic drive mechanism 35 is always energized by the spring to the first position.

A solenoid type drive mechanism may be used instead of the pneumatic drive mechanism 35.

Reference numeral LF denotes a boundary between an engine room (left side from a broken line LF of the drawing) and a compartment chamber (between broken lines LF and LR); and LR, a boundary between the compartment chamber and a trunk room (right side from a broken line LR).

Reference numeral 30 denotes a bump stopper for preventing damage of the wall surface of the main air spring chamber 3 when the cylinder of the shock absorber 1 is largely raised on a rough road.

Reference numeral 31 denotes a mode selection switch (MDSW) as a high vehicle height selection switch. This switch 31 serves to select an AUTO mode for automatically controlling the vehicle height in response to the traveling state of the vehicle to any of the normal vehicle height, the low vehicle height and the high vehicle height, and a high mode for controlling the vehicle height to the high vehicle height to be described in detail later.

The operation of the suspension apparatus constructed as described above will now be described in detail.

Figure 5:
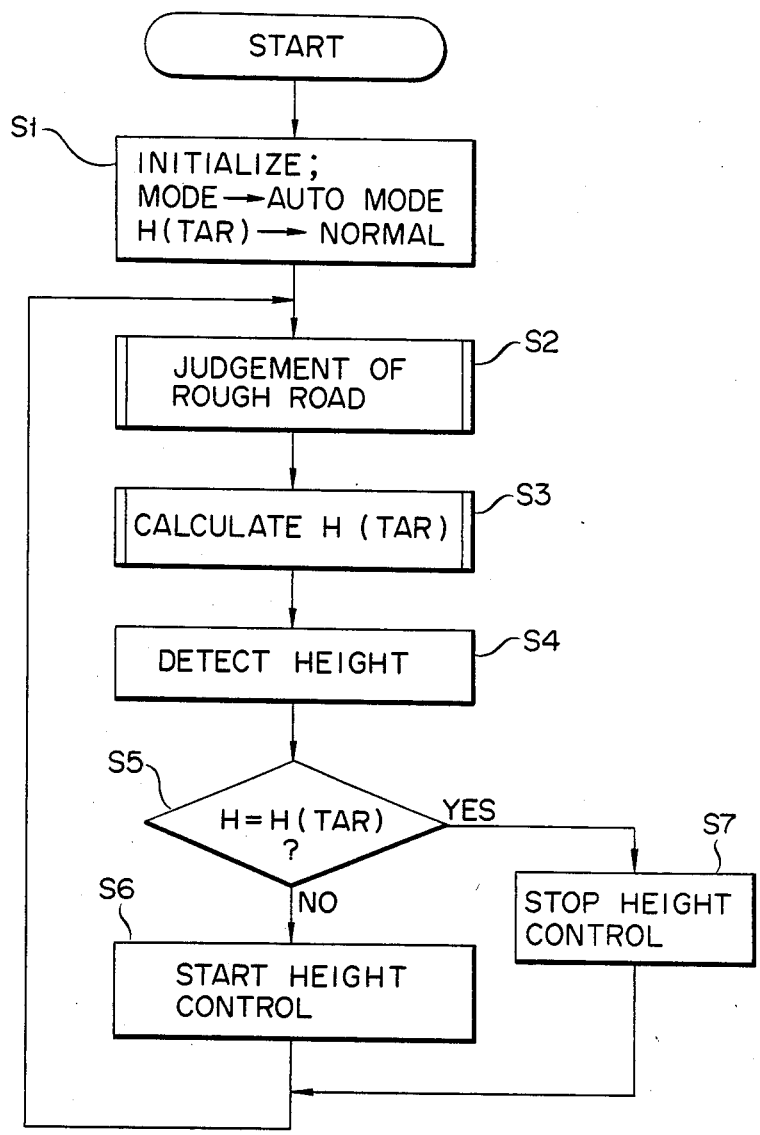
FIG. 5 is a flow chart showing the entire control in a first embodiment of the present invention.

The entire operation will be first described with reference to a flow chart of FIG. 5.

In step S1, the vehicle height control mode is set to the AUTO mode and the target vehicle height H(TAR) is set to the normal vehicle height as an initialization. In step S2, a judgement of a rough road to be described in detail later by referring to FIG. 6, i.e., whether or not the surface of the road where the vehicle travels is rough is performed. In step S3, a setting of the vehicle height H(TAR) to be described in detail later by referring to FIG. 7, i.e., whether or not a setting of the vehicle height H(TAR) is judged. The flow advances to step S4, in which a vehicle height detection signal is read out from the vehicle height sensors 22F, 22R to the control unit 25. In step S5, whether or not the heights H detected by the sensors 22F and 22R are equal to the height H(TAR) set in step S3 is judged. If NO in step S5, the flow advances to step S6 and a vehicle height control is started toward the H(TAR). For example, if the height detected in step S4 is lower than the height H(TAR), air is supplied to the main air spring chambers 3 of the suspension units S to raise the vehicle height. On the other hand, if the height detected in step S4 is higher than the height H(TAR), the control unit 25 controls the solenoid valves to exhaust air from the spring chambers 3 of the respective suspension units S, thereby lowering the vehicle height. Then, the flow returns to step S2. If YES in step S5, i.e., if the height H becomes equal to the height H(TAR), the flow advances to step S7 to stop the vehicle height control.

In step S5, it is preferable to compare the mean value of the vehicle heights detected in step S4 during a set period of time (e.g., 10 sec.) with the height H(TAR) so as to remove noise.

Then, a judgement of a rough road performed in step S2 of FIG. 5 will be described in detail with reference to FIG. 6.

A 2 second timer T for counting two seconds is checked in step S11. In other words, the counting of the timer T is read out in the control unit 25. Then, in step S12, whether or not 2 seconds of period is counted is judged by the timer T. If NO in step 12, the flow advances to next step S13, and the output signals h of the vehicle height sensors 22F and 22R are read out in the control unit 25. In step S14, the output signal g of the acceleration (G) sensor 28 is read out in the control unit 25. The flow returns to step S11 so as to see the next state change.

If 2 seconds are counted by the timer T, YES is judged in step S12, and the flow advances to step S16. In step S16, the timer T is reset. The flow then advances to step S17, the number HH(n) of the vehicle height code "HH" from the signal detected by the sensors 22F and 22R in step S13 is detected, and whether or not the vehicle height code "HH" exist twice or more is judged. In other words, in step S17, whether or not the vehicle heights higher than the high vehicle height level are detected more than twice during 2 seconds is judged. If YES in step S17, the flow advances to step S18. In step S18, the number LL(n) of the vehicle height codes "LL" in the signal detected by the sensors 22F and 22R in step S13 is detected, and whether or not the vehicle height code "LL" exists twice or more is judged. In other words, in step S18, whether or not the vehicle heights lower than the low vehicle height level are detected more than twice during 2 seconds is judged. IF YES in step S18, the flow advances to step S19, the judgement of the rough road is presented. More particularly, a rough road flag FLAG DF is set in a predetermined memory in the control unit 25.

On the other hand, if NO in step S17 or S18, the flow advances to step S20, the number GG(n) of ON of the acceleration sensor 28 is detected on the basis of the output signal g detected by the sensor 28 in step S14, and whether or not the sensor 28 becomes ON more than twice is judged. In other words, in step S20, whether or not the output of sensor 28 is more than a set value for more than two readings during a two second interval is judged.

If NO in step S20, the flow advances to step S21, the judgement of the rough road is eliminated. More specifically, the rough road flag in the control unit 25 is reset. If YES in step S20, the flow advances to step S22, and whether or not the output signals of the sensor 28 become ON more than twice during the previous 2 seconds is judged. If YES in step S22, the flow advances to step S19, and the judgement of the rough road is presented. If NO in step S22, the flow advances to step S21, and the judgement of the rough road is eliminated.

The setting of the height H(TAR) performed in step S3 of FIG. 5 will be described in detail with reference to FIG. 7.

In step S31, whether or not the judgement of a rough road is presented, i.e., whether or not the above-mentioned rough road flag DF is set to "1" is judged. If YES in step S31, the flow advances to step S32, and the high vehicle height H is set as the height H(TAR). On the other hand, if NO in step S31, the flow advances to step S33, and whether or not the AUTO mode is selected by the mode selection switch 31 is judged. If YES in step S33, the flow advances to step S34, and whether or not the normal vehicle height N is set as the height H(TAR) is judged. If NO in step S34, the flow advances to step S35, and whether or not the vehicle velocity V detected by the sensor 27 is 70 km/h or lower is judged. If NO in step S35, the flow advances to step S36, and the low vehicle height L is set as the height H(TAR).

On the other hand, if YES in step S34, the flow advances to step S37, and whether or not the vehicle velocity V detected by the sensor 27 is 90 km/h or higher is judged. If YES in step S37, the flow advances to step S38, and whether or not the vehicle velocity V passes 90 km/h or higher during 10 seconds is judged. If YES in step S38, the flow advances to step S36, and the low vehicle height L is set as the height H(TAR). In other words, if the state that the vehicle velocity is 90 km/h or higher passes during 10 seconds in the state that the normal vehicle height is set as the height H(TAR), i.e., if the state of the vehicle velocity 90 km/h or higher passes during 10 seconds in the accelerated state, the low vehicle height L is automatically set as the height H(TAR). Thus, the traveling stability at the high velocity traveling time can be improved. On the other hand, if NO in step S37, the flow advances to step S39, and the normal vehicle height N is set as the height H(TAR). If the vehicle velocity is then decelerated to 70 km/h or lower from the state that the low vehicle height is set as the height H(TAR) in the case of 90 km/h or higher, i.e., if the vehicle velocity V is decelerated to 70 km/h lower in the decelerated state, the normal vehicle height is set as the height H(TAR) in steps S34, S35 and S39.

If NO in step S33, i.e., if the high mode for setting the high vehicle height is judged, the flow advances to step S40, and whether or not the high vehicle height is set as the height H(TAR) is judged. If YES in step S40, the flow advances to step S41, and whether or not the vehicle V is 70 km/h or higher is judged. If NO in step S41, the flow advances to step S32, and the high vehicle height is continuously set as the height H(TAR). On the other hand, if YES in step S41, the flow advances to step S42, and whether or not the vehicle velocity V of 70 km/h or higher passes during 10 seconds is judged. If NO in step S42, the flow advances to step S32, and the high vehicle height is set as the height H(TAR). If YES in step S40, the flow advances to step S39, and the normal vehicle height is set as the height H(TAR).

If NO in step S40, the flow advances to step S43, and whether or not the low vehicle height is set as the height H(TAR) is judged. If YES in step S43, the flow advances to step S44, and whether or not the vehicle velocity V is 50 km/h or lower is judged. If YES in step S44, the flow advances to step S32, and the high vehicle height is set as the height H(TAR). On the other hand, if NO in step S43 or S44, the flow advances to step S34 as described above, and the height H(TAR) is set similarly to the AUTO mode.

According to the first embodiment described above, when the state that the vehicle travels on a rough road is detected, the high vehicle height is automatically set as the height H(TAR), and the vehicle height is controlled toward the high vehicle height. Therefore, the minimum ground height is raised, the contact of the body B with the surface of the road can be reduced to improve the drivability of the vehicle on a rough road and to reduce damage of the body.

Figure 6:
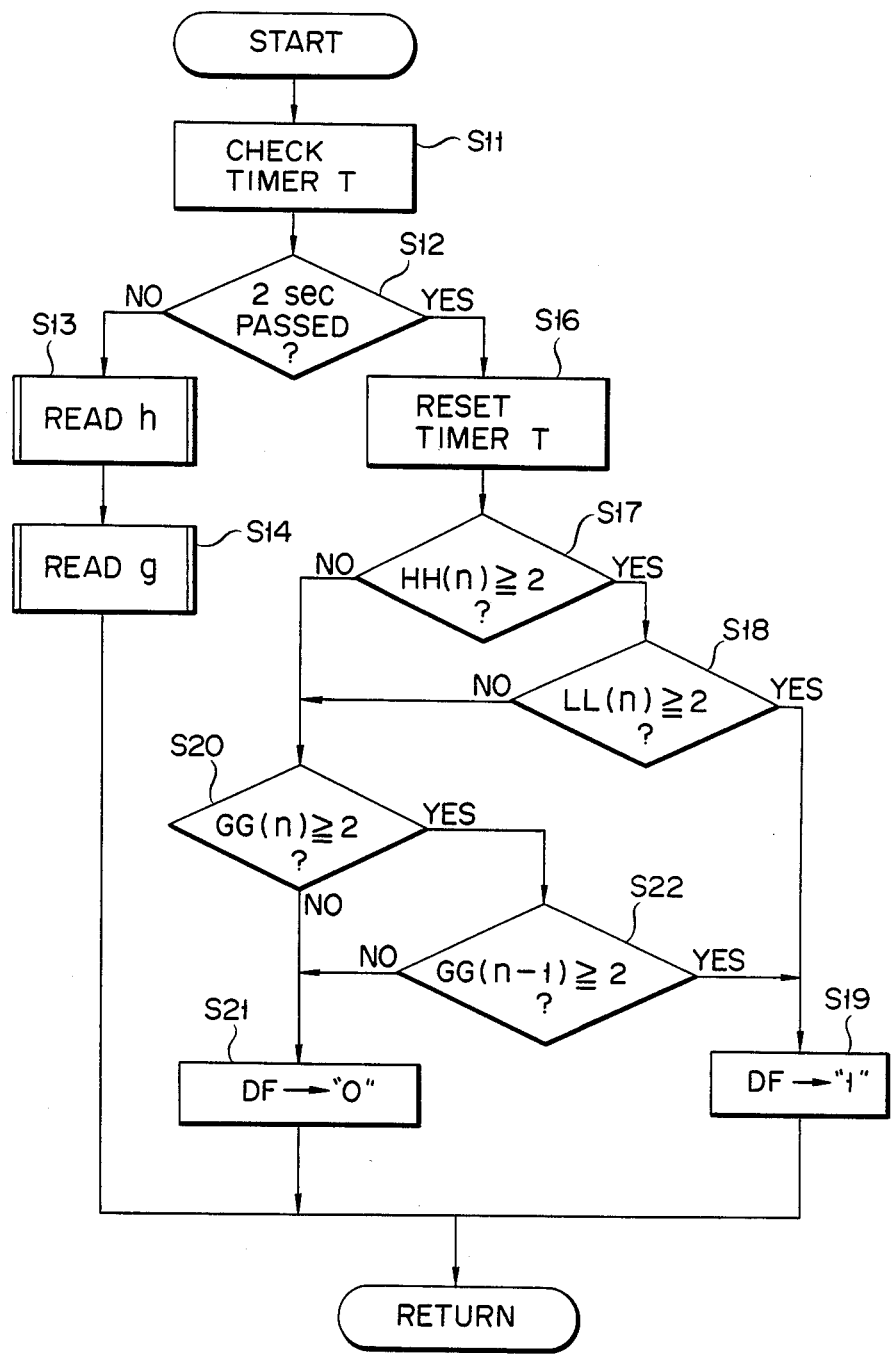
FIG. 6 is a flow chart showing the detail of a rough road judging flow (step S2) of FIG. 5.

In addition, when the judgement of whether or not the vehicle travels on a rough road satisfies, as apparent from the flow chart of FIG. 6, the first condition that the HH codes largely displaced from the normal vehicle height are detected more than twice as the vehicle height detection signal during 2 seconds by the vehicle height sensors 22F and 22R and the LL codes are detected more than twice or the second condition that the state that large changes of the acceleration acted on the vehicle body are detected more than twice during 2 seconds by the acceleration sensor 28 continues twice, judgement of a rough road is presented. Therefore, even if the first condition is not satisfied by the sensors 22F, 22R after the vehicle height is controlled to the high vehicle height, the second condition is satisfied by the sensor 28, and judgement of a rough road can be reliably performed, thereby eliminating a hunting of controlling the vehicle height when the vehicle travels on a rough road as in the conventional suspension apparatus. It is in the general knowledge that the displacement of the stroke of the suspension occurs before the variation of the acceleration acted on the vehicle body immediately after the vehicle transfers from a good road to a rough road, but even if the second condition is not satisfied by the sensor 28, the first condition is satisfied by the sensors 22F, 22R, and judgement of a rough road can be reliably performed without time delay.

Further, when the mode selection switch 31 is provided and the high mode is selected, the high vehicle height can be set as the height H(TAR). In addition, if the state of 70 km/h of the vehicle velocity passes during 10 seconds even when the high mode is selected, the height H(TAR) is automatically altered to the normal vehicle height, and the height H(TAR) is set on the basis of the AUTO mode. Therefore, the state that the vehicle continues to travel at the high height can be avoided.

When the AUTO mode is selected, the normal vehicle height is ordinarily set as the height H(TAR), the low vehicle height is set as the height H(TAR) at 90 km/h or higher in the accelerated state, and the normal vehicle height is set then in the decelerated state at 70 km/h or lower. Thus, the vehicle height decreases at the high velocity traveling time to remarkably improve the driving stability.

In the first embodiment described above, the acceleration sensor 28 can detect the forward and backward, leftward and rightward and upward and downward decelerations acted on the vehicle body. However, if it may be an acceleration sensor capable of detecting the upward and downward accelerations acted on the body in the above-mentioned judgement of a rough road, it is sufficient. Further, the acceleration sensor may be constructed to become ON, for example, by approx. 0.5 G of the upward and downward accelerations If the acceleration sensor 28 can detect the upward and downward forward and backward, and leftward and rightward accelerations, it is possible to determine not only whether the vehicle is running on a rough road but also whether it suddenly accelerates, decelerates, or turns. In that case the sensor can be used with a suspension apparatus designed to provide, for instance, hard suspension when the sensor is on, to thereby reduce changes in the position of the vehicle body.

Moreover, if judgement of a rough road is presented, the 3-way switching valves 36 are controlled to the second position by the control unit 25 to improve the drivability of a rough road by switching the suspension unit S to a hard state by the pneumatic drive mechanism 35.

A second embodiment of the present invention will be described in detail with reference to FIGS. 8 and 9. The second embodiment is constructed fundamentally in the same manner as the first embodiment, but the following points of the second embodiment are different from the first embodiment.

Figure 8:
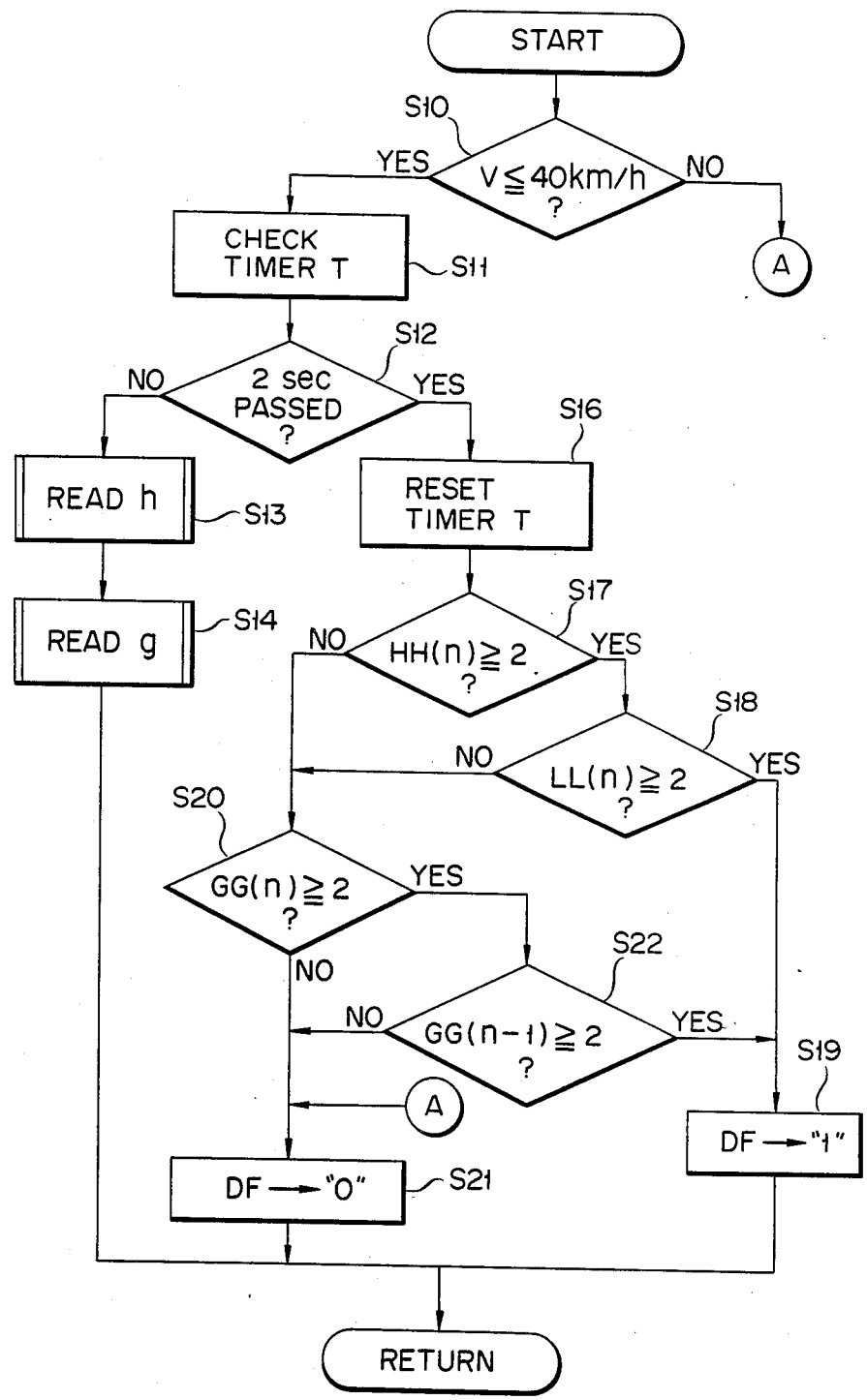
FIG. 8 is a flow chart showing the detail of a rough road judging flow in a second embodiment of the present invention.

First, as apparent from FIG. 8, in the judging flow of a rough road, step S10 is provided before step S11 in flow chart of FIG. 6. The step S10 judges whether or not the vehicle velocity V is 40 km/h or lower. If YES, the flow advances to step S11, and if NO, the flow advances to step S21.

Figure 7:
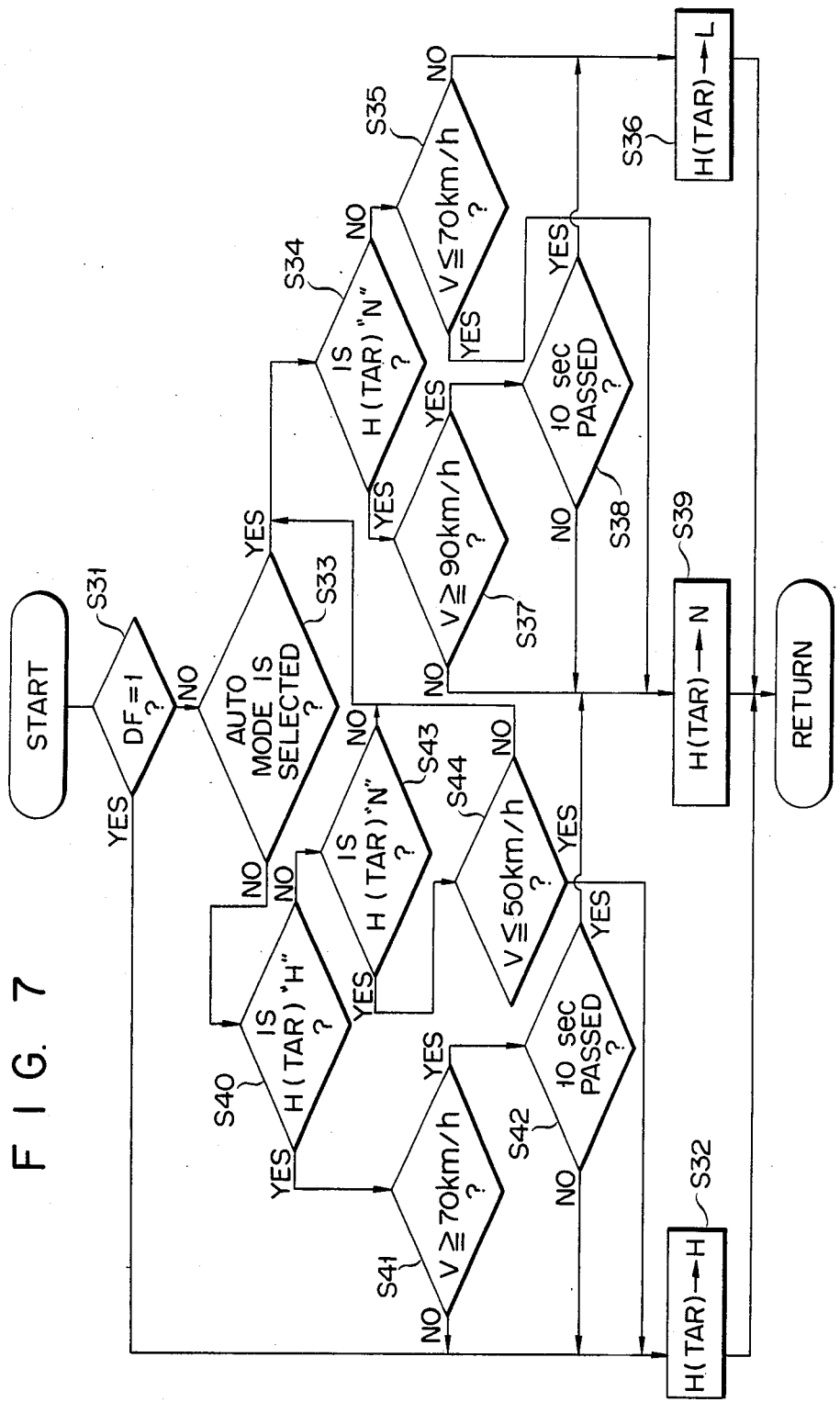
FIG. 7 is a flow chart showing the detail of a target vehicle height judging flow (step S3) of FIG. 5.
Figure 9:
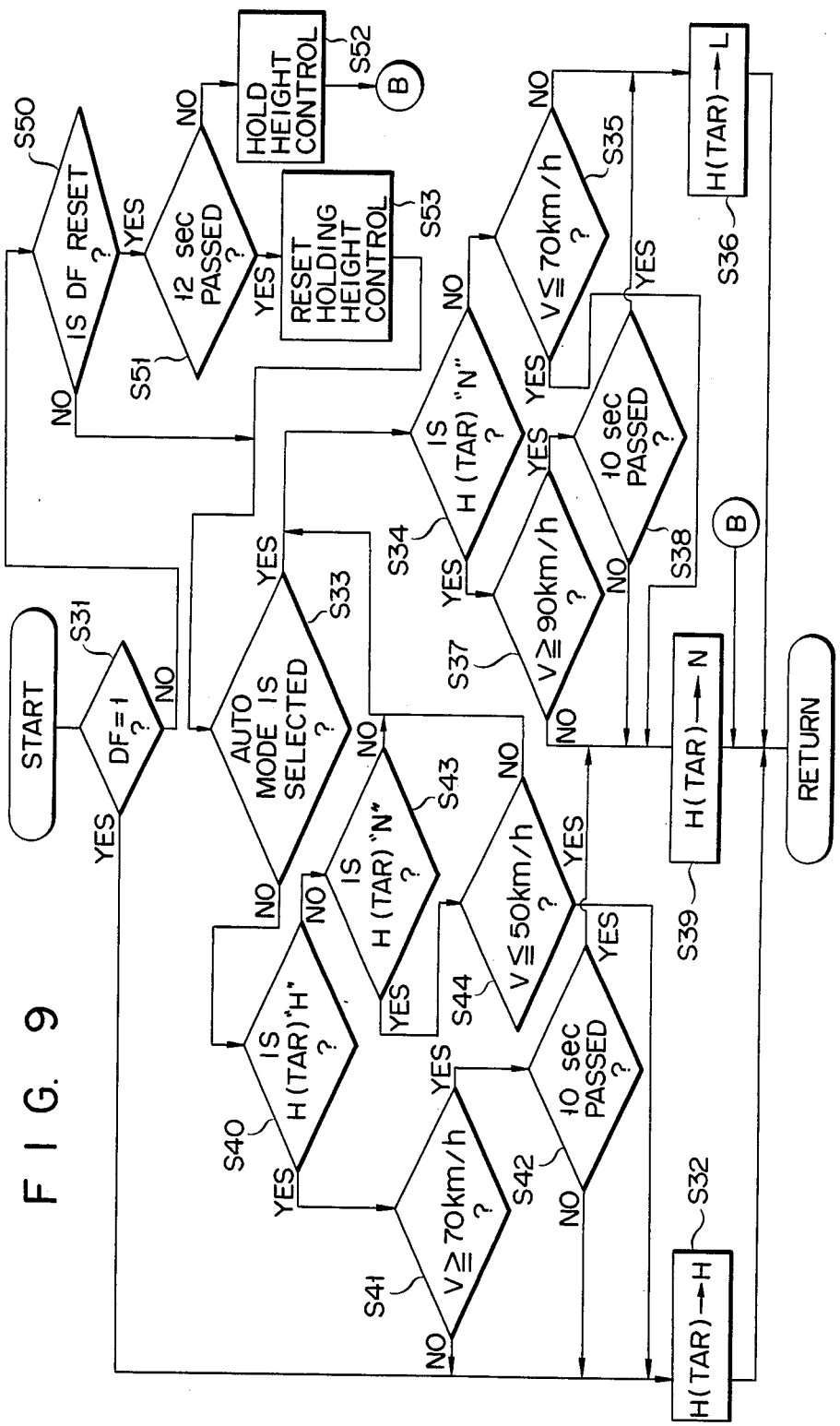
FIG. 9 is a flow chart showing the detail of a target vehicle height judging flow in the second embodiment.

Second, as apparent from FIG. 9, in the judging flow of the height H(TAR), steps S50 to S53 are provided between step S31 and step S33 of the flow chart of FIG. 7. In step S50, whether or not judgement of a rough road is eliminated is judged. If NO in step S50, the flow advances to step S33. If YES in step S50, the flow advances to step S51, and whether or not a period of 12 seconds passes from judgement of a rough road is judged. If NO in step S51, the flow advances to step S52, and the control of the vehicle height remains, i.e., supply and air exhaust to the respective suspension units are stopped. Then, the flow returns to RETURN, i.e., step S31 to see the next state change. On the other hand, if YES in step S51, the flow advances to step S53. In step S52, the remainder of the vehicle height control performed in step S52 is eliminated, and the flow then advances to step S33.

In the flow charts of FIGS. 8 and 9, the portion substantially the same as the first embodiment denote the same portion as in the first embodiment, and the detailed description will be omitted.

According to the second embodiment described above, the same advantages as those in the first embodiment can be provided, and the following additional advantages can be provided.

The judgement of the rough road can be performed only when the vehicle velocity is 40 km/h or lower by providing step S10 in the judgement of the rough road shown in FIG. 8, and when the vehicle velocity exceeds 40 km/h, the flow advances to step S21 to eliminate the judgement of the rough road. This is because, when the vehicle velocity exceeds 40 km/h, there is no rough road of the degree to travel by holding the high vehicle height of the vehicle. Thus, unnecessary judgement of the rough road can be eliminated to raise the calculating velocity of the microcomputer as the calculator in the control unit 25.

The following advantages can be provided in the setting of the height H(TAR) shown in FIG. 9. In the first embodiment described above, when the vehicle travels repeatedly over the good road and the rough road, the normal vehicle height is set as the height H(TAR) in the good road, and the high vehicle height is set as the height H(TAR) in the rough road. Therefore, the height H(TAR) is alternatively changed to between the normal vehicle height and the high vehicle height, and vehicle height raising and lowering controls are alternatively repeated. Thus, air consumption increases to increase the power consumption of a battery power source by the frequent operations of the compressor 11. If a lamp for indicating the continuous vehicle height control is provided, the lamp flickers ON and OFF which indicates a danger warning to the driver. However, according to the second embodiment, even if the judgement of the rough road is eliminated, the vehicle height control remains during 12 seconds by providing steps S50 to S53 in the judgement of the height H(TAR) shown in FIG. 9, thereby substantially eliminating the above-mentioned problem.

A third embodiment of the present invention will be described in detail with reference to FIG. 10.

Figure 10:
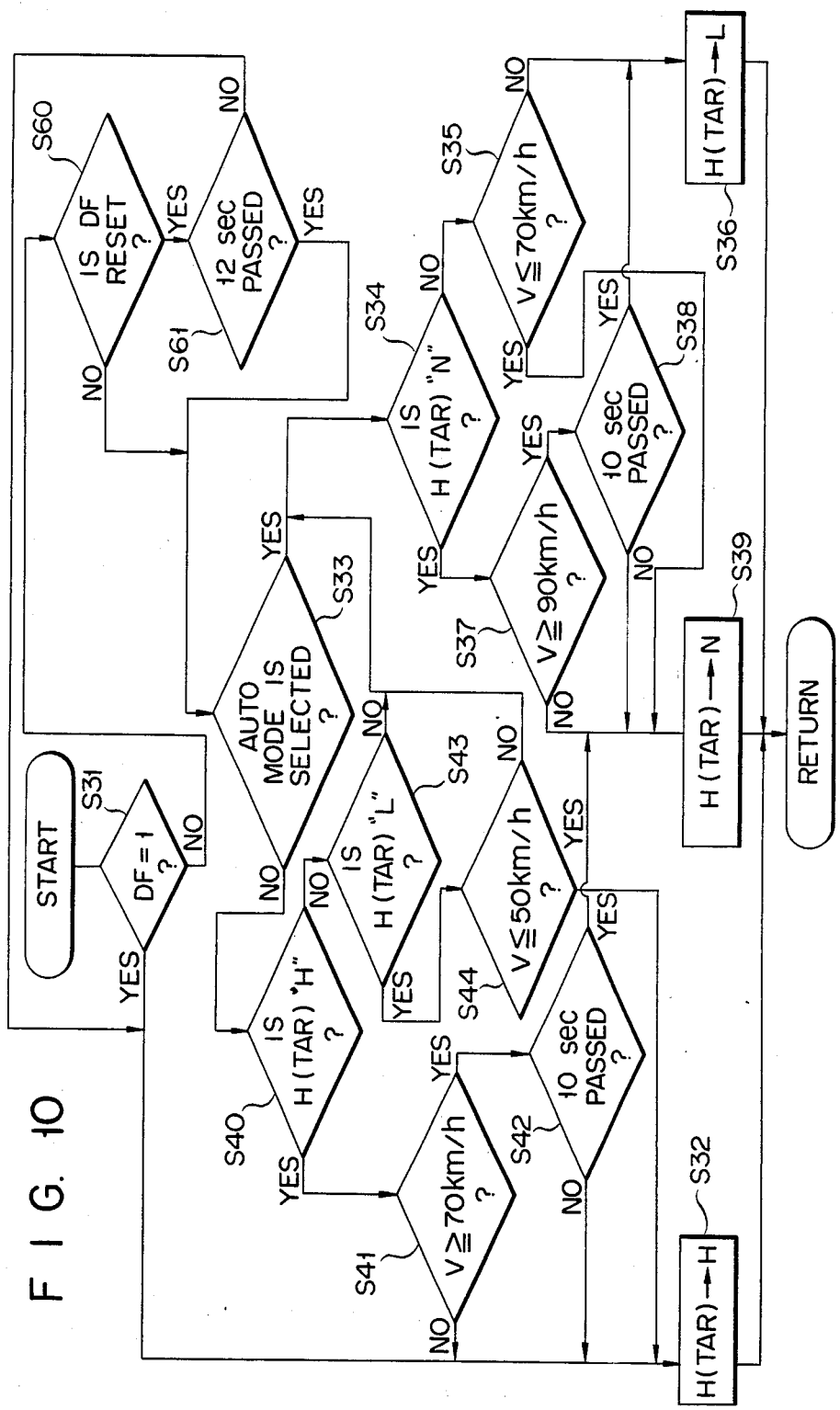
FIG. 10 is a flow chart showing the detail of a rough road judging flow in a third embodiment of the present invention.

The third embodiment is substantially the same as the second embodiment, except steps S60 and S61 are provided instead of the steps S50, S51, S52 and s53 in the flow chart of FIG. 9 in the setting flow of the height H(TAR) as apparent from FIG. 10. In step S60, whether or not the judgement of the rough road is eliminated is judged. If NO in step S60, the flow advances to step S33. If YES in step S60, the flow advances to step S61, and whether or not 12 seconds passes after the judgement of the rough road is eliminated is judged. If NO in step S61, the flow advances to step S32, and the high vehicle height is set as the height H(TAR). On the other hand, if YES in step S61, the flow advances to step S33.

The same portion as that in the flow chart of the second embodiment in FIG. 9 denotes the same portion with the same reference numerals in the flow chart of FIG. 10, and the detailed description will be omitted.

According to the third embodiment, the high vehicle height H is set as the height H(TAR) during 12 seconds even if the judgement of the rough road is eliminated by providing steps S60 and S61, thereby providing the same advantages as those in the second embodiment.

A fourth embodiment of the present invention will be described in detail with reference to FIG. 11.

Figure 11:
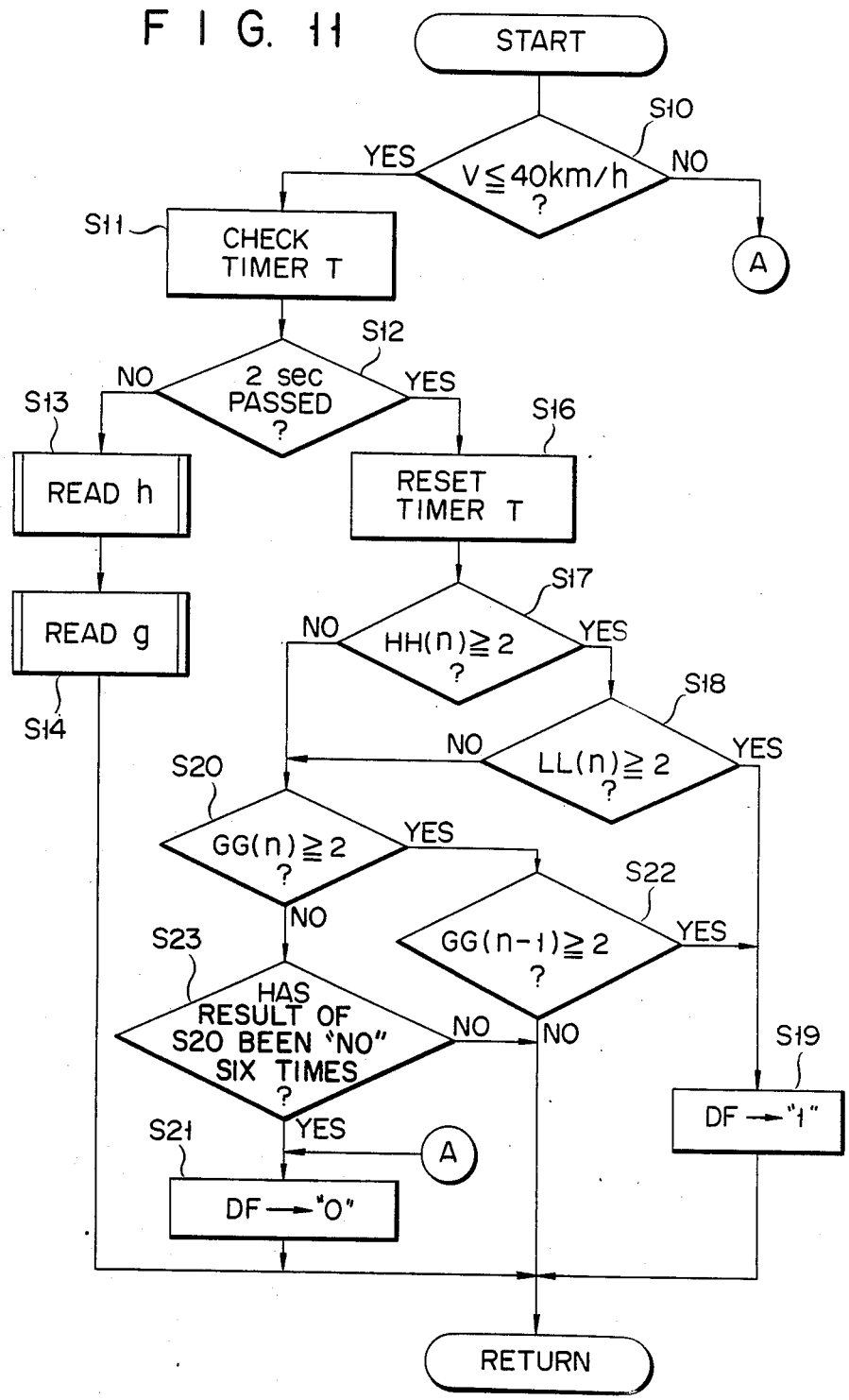
FIG. 11 is a flow chart showing the detail of a rough road judging flow in a fourth embodiment of the invention.

The fourth embodiment is substantially the same as the first embodiment, except that step S23 is provided between step S20 and step S21 in the flow chart of FIG. 6 in the judgement of the rough road as apparent from FIG. 11. In step S23, whether or not six consistencies of the judgement of the rough road performed during 2 seconds are presented is judged. In other words, in step S23, whether or not the judgement of the rough road during 12 seconds is not presented is judged. If YES in step S23, the flow advances to S21 to eliminate the judgement of the rough road. If NO in step S23, the flow returns to RETURN, i.e., returns to step S10 to see the next state change.

In the flow chart of FIG. 11, the same portions as those in the first embodiment in FIG. 6 denote the same portions, and the detailed description will be omitted.

According to the fourth embodiment described above, the judgement of the rough road is eliminated after the judgement of the rough road continues not to be presented during 12 seconds in the state that the judgement of the rough road is already presented by providing step S23 in the judging flow of the rough road. Therefore, the same advantages as those in the second and third embodiments can be provided.

A fifth embodiment of the present invention will be described in detail with reference to FIG. 12.

Figure 12:
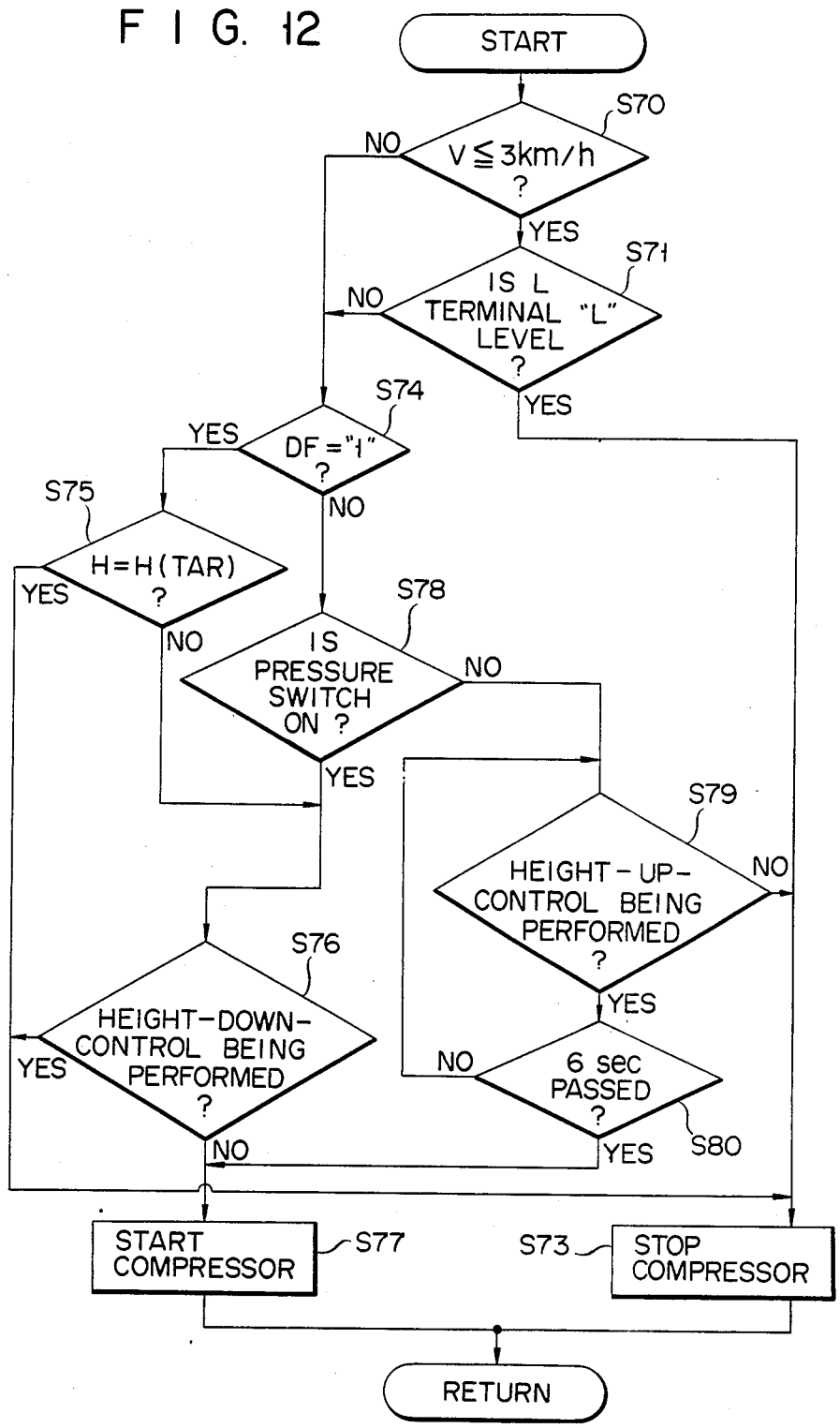
FIG. 12 is a flow chart for controlling a compressor in a fifth embodiment of the present invention.

The fifth embodiment is substantially the same as the first embodiment, except that the ON and OFF controls of the compressor are performed on the basis of the flow chart in FIG. 12 by the control unit 25.

In step S70, whether or not the vehicle velocity V detected by the vehicle velocity sensor 27 is 3 km/h or lower, i.e., whether or not the vehicle is substantially stopped is judged. If YES in step S70, the flow advances to S71, whether or not the L terminal of a generator driven by an engine for driving the vehicle (not shown) is set to "L" level is judged. If YES in step S71, the flow advances to step S73, a stop signal is outputted from the control unit 25 to the compressor 11 to stop the compressor. Steps S70, S71 and S72 are provided to stop the compressor 11 when the vehicle velocity is 3 km/h and the L terminal of the generator is "L" level, i.e., when a stop of an engine is judged, thereby preventing the battery from supplying electric power to the compressor 11 to discharge the battery.

On the other hand, if NO in step S70 or S71, the flow advances to step S74, and whether or not the judgement of the rough road is presented is judged. The judgement of the rough road means the execution in the flow chart of FIG. 6. If YES in step, S74, the flow advances to step S75, and whether or not the vehicle height H coincides with the height H(TAR) is judged. If NO in step S75, the flow advances to step S76, and whether or not the height-down-control is performing is judged. This is judged by whether or not the exhaust air solenoid valve 19 is closed and whether or not the air intake solenoid valve 21 is opened are, for example, judged. If NO in step S76, i.e., if the vehicle height-up-control is performing, the flow advances to step S77, a start signal is outputted from the control unit 25 to the compressor 11 to drive the compressor 11. If the vehicle height does not coincide with the height H(TAR) in the state that the judgement of the rough road is presented as described above and the vehicle height-up-control is performing, the compressor 11 is always driven. Thus, compressed air is fed from the compressor 11 directly to the air spring chamber of the suspension unit S, and the internal pressure in the reserve tank 20 becomes sufficiently high. Therefore, the vehicle height-up-control can be rapidly performed. In this manner, when the vehicle height-up-control is performed and the vehicle height reaches the high vehicle height as the height H(TAR), YES is judged in step S75, and the flow is advanced to next step S73 to stop the compressor 11.

On the other hand, if NO in step S74, the flow advances to step S78, and whether or not a pressure switch 201 for detecting the internal pressure of the reserve tank 20 is ON is judged. The switch 201 becomes ON when the internal pressure in the tank 20 decreases to a set value or lower, and the set value is set to a necessary value for performing the vehicle height control. If YES in step S78, the flow advances to step S76. If NO in step S78, i.e., if the fact that the internal pressure in the tank 20 is sufficient is judged, the flow advances to next step S79.

In step S79, whether or not the vehicle height raising control is performing is judged. This is judged by whether or not the exhaust air solenoid valve 19 is closed and the air intake solenoid valve 21 is opened. If NO in step S79, the flow advances to step S73. In other words, if the internal pressure in the tank 20 is sufficient and the vehicle height-up-control is not performing, the compressor 11 is stopped.

On the other hand, if YES in step S79, the flow advances to S80, and whether or not 6 seconds pass from the start of the vehicle height raising control is judged. If YES in step S80, the flow advances to step S77 to drive the compressor 11. If NO in step S80, the flow returns to step S79 to see the next state change.

According to the fifth embodiment as apparent as described above, when the judgement of the rough road is presented and the necessity of raising the vehicle height to the high vehicle height occurs, the compressor 11 is driven to rapidly perform the vehicle height raising control.

In the embodiments described above, air springs are employed in the suspension apparatus. However, the present invention may employ a suspension apparatus of another type such as a suspension apparatus of a hydro-pneumatic type.

What is claimed is:
1. A vehicle suspension apparatus comprising:
fluid spring chambers provided between wheels and a vehicle body for controlling a vehicle height;
fluid supply means for supplying a fluid from a fluid supply source to the fluid spring chambers through supply valves;
fluid exhaust means for exhausting the fluid from the fluid spring chambers through fluid exhaust valves;
a vehicle height sensor for detecting a vehicle height;
an acceleration sensor for detecting the upward and downward accelerations acted on the vehicle body;
vehicle height control means for controlling the fluid supply valves or the fluid exhaust valves to control the vehicle height toward a target vehicle height by comparing the vehicle height detected by the vehicle height sensor with a set target vehicle height;

rough road judging means for judging a rough road when satisfying a first condition for detecting more than a predetermined number of the vehicle heights exceeding a set range of the vehicle height within a set period of time by the vehicle height sensor or satisfying a second condition for detecting more than a predetermined number of changes of the acceleration exceeding a set range of the acceleration within a set period of time by the acceleration sensor and eliminating the judgment of the rough road when not satisfying any of the first and second conditions; and target vehicle height set means for setting a normal vehicle height as a target vehicle height in the control means at a normal condition and setting a vehicle height higher than the normal vehicle height as a target vehicle height when the judgment of the rough road is made by the rough road judgment means;

wherein after said rough road judgment is presented by said rough road judging means, said rough road judging means or said target vehicle height set means is constructed to hold the vehicle height at the high vehicle height at the set time from that time when any of the first and second conditions is not satisfied by said vehicle height sensor and said acceleration sensor.

2. An apparatus according to claim 1, further comprising:

a vehicle velocity sensor for detecting the vehicle velocity; wherein said target vehicle height set means is constructed to set the normal vehicle height as the target vehicle height and a low vehicle height lower than the normal vehicle height in addition to the high vehicle height and to set the low vehicle height as the target vehicle height when the vehicle velocity detected by the vehicle velocity sensor is higher than a first set vehicle velocity.

3. An apparatus according to claim 2, wherein said target vehicle height set means is constructed to set the low vehicle height as the target vehicle height when the vehicle velocity is higher than a first set vehicle velocity, and to set the normal vehicle height as the target vehicle height when the vehicle velocity becomes lower than a second set vehicle velocity lower than the first set vehicle velocity in the decelerated state in the state the low vehicle height is already set as the target vehicle height.

4. An apparatus according to claim 2, wherein said target vehicle height set means is constructed to set the target vehicle height on the basis of any of a high mode for setting the high vehicle height stationary as the target vehicle height and an AUTO mode for setting the normal vehicle height as the target vehicle height at the ordinary traveling time and setting the low vehicle height as the target vehicle height when the vehicle velocity is higher than the first set vehicle velocity, and further comprising a mode selection switch for selecting any of the high mode and the AUTO mode in said target vehicle height set means.

5. An apparatus according to claim 4, wherein said target vehicle height set means is constructed to set the high vehicle height as the target vehicle height only when the vehicle velocity detected by said vehicle velocity sensor is lower than a third set vehicle velocity in case that the high mode is selected by said mode selection switch and to set the target vehicle height in accordance with the AUTO mode when exceeding the third set vehicle velocity.

6. An apparatus according to claim 1, wherein said target vehicle height set means is constructed to inhibit the vehicle height control during the set time from that time when the judgement of the rough road is eliminated by said rough road judging means after the judgement of the rough road is presented by said rough road judging means.

7. An apparatus according to claim 1, wherein after said rough road judgement is presented by said rough road judging means, said rough road judging means is constructed to continue to set the high vehicle height as the target vehicle height during the set time from that time when the judgement of the rough road is eliminated by said rough road judging means.

8. An apparatus according to claim 1, wherein said rough road judging means is constructed to eliminate the judgement of the rough road when the state that any of the first and second conditions is not satisfied by said vehicle height sensor and said acceleration sensor is continued after the rough road judgement is presented by said rough road judging means.

9. An apparatus according to claim 1, wherein said rough road judging means is constructed to eliminate the judgement of the rough road when the vehicle velocity detected by said vehicle velocity sensor exceeds a further set vehicle velocity.

10. An apparatus according to claim 1, wherein said vehicle height control means, said rough road judging means and said target vehicle height set means are control units having a microcomputer.

11. An apparatus according to claim 1, wherein the suspension apparatus is hydropneumatic.

12. A vehicle suspension apparatus comprising:

air spring chambers provided between wheels and a vehicle body for controlling a vehicle height;

air supply means for supplying a air from a air supply source to the air spring chambers through supply valves;

air exhaust means for exhausting the air from the air spring chambers through air exhaust valves;

a vehicle height sensor for detecting a vehicle height;

an acceleration sensor for detecting the upward and downward accelerations acted on the vehicle body;

vehicle height control means for controlling the air supply valves or the air exhaust valves to control the vehicle height toward a target vehicle height by comparing the vehicle height detected by the vehicle height sensor with a set target vehicle height;

rough road judging means for judging a rough road when satisfying a first condition for detecting more than a predetermined number of the vehicle heights exceeding a set range of the vehicle height within a set period of time by the vehicle height sensor or satisfying a second condition for detecting more than a predetermined number of changes of the acceleration exceeding a set range of the acceleration within a set period of time by the acceleration sensor and eliminating the judgment of the rough road when not satisfying any of the first and second conditions; and target vehicle height set means for setting a normal vehicle height as a target vehicle height in the control means at a normal condition and setting a vehicle height higher than the normal vehicle height as a target vehicle height when the judgment of the rough road is made by the rough road judgment means;

wherein after said rough road judgment is presented by said rough road judging means, said rough road judging means or said target vehicle height set means is constructed to hold the vehicle height at the high vehicle height at the set time from that time when any of the first and second conditions is not satisfied by said vehicle height sensor and said acceleration sensor.

13. An apparatus according to claim 12, wherein said compressed air supply source is a reserve tank for reserving air compressed by a compressor.

14. An apparatus according to claim 13, further comprising:

an internal pressure sensor for detecting the internal pressure of said reserve tank, and compressor control means for driving the compressor when inputting the detection signal of said internal pressure sensor and driving the compressor when the internal pressure of the reserve tank decreases to the set value or lower.

15. An apparatus according to claim 14, wherein said compressor control means is constructed to drive the compressor when the judgement of the rough road is presented by said rough road judging means and the vehicle height raising control is performed by said vehicle height control means.

16. An apparatus according to claim 13, wherein said compressed air supply source further comprises a circuit connected to the supply valve bypassing the reserve tank.

17. An apparatus according to claim 12, wherein said vehicle height control means, said rough road judging means, said target vehicle height set means and said compressor control means are control units having a microcomputer.

* * * * *